L. V. CRAM.
ROD SUPPORT.
APPLICATION FILED JUNE 13, 1919.
1,342,099.
Patented June 1, 1920.
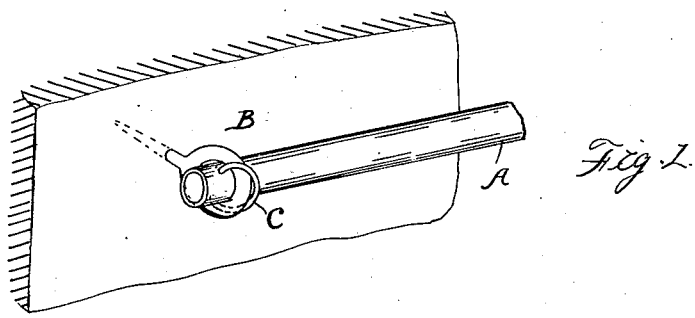
Fig. 1.
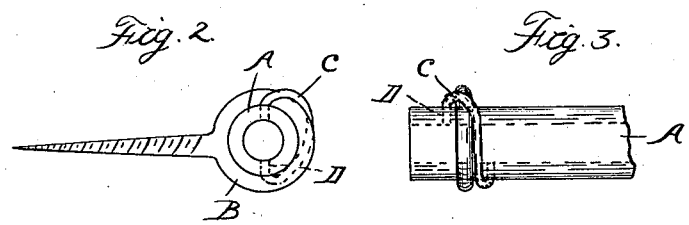
Fig. 2.
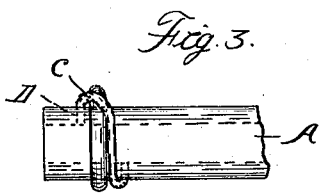
Fig. 3.
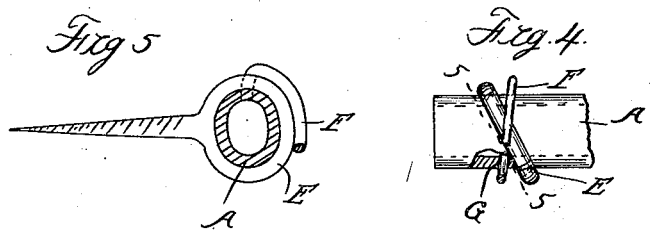
Fig. 5.
Fig. 4.
Inventor
Leroy V. Cram
By Whittemore Hulbert + Whittemore
Attorneys

UNITED STATES PATENT OFFICE.

LEROY V. CRAM, OF DETROIT, MICHIGAN.

ROD-SUPPORT.

1,342,099. Specification of Letters Patent. Patented June 1, 1920.

Application filed June 13, 1919. Serial No. 303,944.

*To all whom it may concern:*

Be it known that I, LEROY V. CRAM, a citizen of the United States of America, residing at Detroit, in the county of Wayne and State of Michigan, have invented certain new and useful Improvements in Rod-Supports, of which the following is a specification, reference being had therein to the accompanying drawings.

This invention relates to rod supports and relates more particularly to means for supporting such small metal rods as are commonly used for hanging curtains and for other household purposes.

It is the object of the invention to provide a simple and inexpensive means for supporting a rod and for detachably securing the rod to its support to avoid any accidental disengagement.

In the drawings:

Figure 1 is a perspective view of a rod engaged at an extremity by the herein described supporting device;

Fig. 2 is an end view of the same;

Fig. 3 is a front view of an end portion of the rod and its support;

Fig. 4 is a view similar to Fig. 3 of a slightly modified construction;

Fig. 5 is a section on line 5—5 of Fig. 4.

In these views, the reference character A designates a rod, preferably metallic, and in this instance disclosed as tubular, said rod having its extremity entering the eye of an eye-screw B, the latter being mounted upon a wall or window frame or suitable support. As a quick detachable securing means to maintain said rod in engagement with the eye screw, a C-shaped wire spring C is employed coacting with said eye-screw, said spring being spirally bent and having its extremity bent to a radial relation to the axis of the spiral. By stressing such a spring, its extremities may be spread apart sufficiently to permit snapping the same into a pair of sockets D formed adjacent to the end of the rod A at opposite sides thereof and offset longitudinally to a degree permitting engagement of the eye-bolt between said sockets.

It is evident that when an extremity of the rod A is so positioned within the eye of the bolt B that the pair of sockets D are situated respectively at each side of said eye and the extremities of the spring C are then snapped into engagement with the pair of sockets, said spring, since it must extend diagonally across the eye of the screw, as shown in Fig. 3, will securely lock the rod against any disengagement from the eye screw.

In the modified construction shown in Figs. 4 and 5, an eye-screw having an elliptical eye E is employed, this shape permitting said eye to embrace the rod A diagonally, and permitting use of a non-spiral C-shaped spring F engaging diametrically opposed sockets G in the rod.

It is a feature of the above described invention that the securing means may be applied or detached in a moment's time and also that the simplicity of the device reduces manufacturing costs to a minimum. It is also to be noted that the supporting member and securing means occupy very little space and might readily be concealed by a curtain or drapery disposed upon the rod A.

A desirable characteristic of the invention resides in the fact that the latch member has no projecting ends which may tear or otherwise injure fabrics coming in contact with said member.

What I claim as my invention is:

1. The combination with a rod and support for said rod, of a quick detachable latch member restraining said rod against longitudinal shifting in said support.

2. The combination with a rod and an annular support therefor, of a spring fastening member for securing said rod against longitudinal shifting within its support.

3. The combination with a rod and an annular support therefor, of a spring latch member crossing said support and detachably engaging the rod at each side of the support.

4. The combination with a rod and an annular support therefor, said rod having sockets at each side of said support, of a spring latch member crossing said support and having its extremities detachably engaging in said sockets.

5. The combination with a rod having a pair of sockets respectively formed at opposite sides thereof and offset longitudinally, of an annular support for said rod engageable between said sockets, and a C-shaped spiral spring having its extremities bent substantially radially to the axis of the spiral, said extremities being engageable in said sockets to lock the rod against disengagement from the support.

6. The combination with a rod having a pair of sockets therein at opposite sides thereof, of an annular support for said rod engaging the same between said sockets, and a latch member extending across said support and having its extremities detachably engaging said sockets.

In testimony whereof I affix my signature.

LEROY V. CRAM.